US009152490B2

(12) United States Patent
Ahmadi-Ardakani

(10) Patent No.: US 9,152,490 B2
(45) Date of Patent: Oct. 6, 2015

(54) DETECTION OF USER BEHAVIOR USING TIME SERIES MODELING

(71) Applicant: Western Digital Technologies, Inc., Irvine, CA (US)

(72) Inventor: Arya Ahmadi-Ardakani, Mission Viejo, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 32 days.

(21) Appl. No.: 14/063,982

(22) Filed: Oct. 25, 2013

(65) Prior Publication Data

US 2014/0298117 A1    Oct. 2, 2014

Related U.S. Application Data

(60) Provisional application No. 61/807,665, filed on Apr. 2, 2013.

(51) Int. Cl.
    *G06F 13/00*    (2006.01)
    *G06F 11/07*    (2006.01)
    *G06F 12/00*    (2006.01)

(52) U.S. Cl.
    CPC .................................. *G06F 11/0757* (2013.01)

(58) Field of Classification Search
    CPC .................................. G06F 13/00; G06F 12/00
    USPC .................. 710/62; 713/300; 711/137, 154
    See application file for complete search history.

(56) References Cited

U.S. PATENT DOCUMENTS

| | | | |
|---|---|---|---|
| 6,499,054 B1 | 12/2002 | Hesselink et al. | |
| 6,732,158 B1 | 5/2004 | Hesselink et al. | |
| 6,757,622 B2 * | 6/2004 | Fioravanti | 702/39 |
| 6,892,313 B1 | 5/2005 | Codilian et al. | |
| 7,100,074 B2 * | 8/2006 | Watanabe et al. | 714/5.1 |
| 7,120,692 B2 | 10/2006 | Hesselink et al. | |
| 7,120,806 B1 | 10/2006 | Codilian et al. | |
| 7,334,082 B2 | 2/2008 | Grover et al. | |
| 7,411,757 B2 | 8/2008 | Chu et al. | |
| 7,454,443 B2 | 11/2008 | Ram et al. | |
| 7,467,187 B2 | 12/2008 | Hesselink et al. | |
| 7,516,346 B2 | 4/2009 | Pinheiro et al. | |
| 7,546,353 B2 | 6/2009 | Hesselink et al. | |
| 7,587,467 B2 | 9/2009 | Hesselink et al. | |
| 7,600,036 B2 | 10/2009 | Hesselink et al. | |

(Continued)

FOREIGN PATENT DOCUMENTS

JP      2003-309797      10/2003

OTHER PUBLICATIONS

International Search Report and Written Opinion dated Sep. 3, 2014 from related PCT Serial No. PCT/US2014/032424, 14 pages.

*Primary Examiner* — Christopher Shin

(57) ABSTRACT

The embodiments provide a way to predict when a storage device will be accessed. In order to enhance performance, the storage device may proactively prepare for the access operation, and thus, minimize the access-time response of the storage device. The user behavior is recorded over time and collected into a dataset. In one embodiment, the intervals between the data points in the dataset are calculated and arranged into a matrix. Patterns in the matrix are recognized and used to recognize the next likely access by the user. The storage device may then take various actions, such as drive spin up, in anticipation of the next predicted access to minimize access-time response.

22 Claims, 7 Drawing Sheets

(56) References Cited

U.S. PATENT DOCUMENTS

| | | |
|---|---|---|
| 7,788,404 B2 | 8/2010 | Hesselink et al. |
| 7,840,820 B2 * | 11/2010 | Shimada .................. 713/300 |
| 7,917,628 B2 | 3/2011 | Hesselink et al. |
| 7,934,251 B2 | 4/2011 | Hesselink et al. |
| 7,949,564 B1 | 5/2011 | Hughes et al. |
| 8,004,791 B2 | 8/2011 | Szeremeta et al. |
| 8,239,644 B2 * | 8/2012 | Asano et al. ............... 711/161 |
| 8,255,661 B2 | 8/2012 | Karr et al. |
| 8,285,965 B2 | 10/2012 | Karr et al. |
| 8,341,117 B2 | 12/2012 | Ram et al. |
| 8,341,275 B1 | 12/2012 | Hesselink et al. |
| 8,352,567 B2 | 1/2013 | Hesselink et al. |
| 8,526,798 B2 | 9/2013 | Hesselink |
| 8,631,284 B2 | 1/2014 | Stevens |
| 8,646,054 B1 | 2/2014 | Karr et al. |
| 8,661,507 B1 | 2/2014 | Hesselink et al. |
| 8,688,797 B2 | 4/2014 | Hesselink et al. |
| 8,713,265 B1 | 4/2014 | Rutledge |
| 8,762,682 B1 | 6/2014 | Stevens |
| 8,780,004 B1 | 7/2014 | Chin |
| 8,793,374 B2 | 7/2014 | Hesselink et al. |
| 8,819,443 B2 | 8/2014 | Lin |
| 8,892,842 B2 * | 11/2014 | Kim et al. .................. 711/170 |
| 2002/0013915 A1 * | 1/2002 | Migita et al. ............... 714/6 |
| 2002/0199129 A1 * | 12/2002 | Bohrer et al. ............... 714/7 |
| 2005/0132256 A1 * | 6/2005 | Watanabe et al. ........... 714/42 |
| 2005/0144195 A1 | 6/2005 | Hesselink et al. |
| 2005/0144200 A1 | 6/2005 | Hesselink et al. |
| 2006/0069886 A1 * | 3/2006 | Tulyani .................... 711/161 |
| 2007/0150661 A1 | 6/2007 | Suda |
| 2008/0104431 A1 * | 5/2008 | Shimada .................. 713/300 |
| 2010/0299547 A1 * | 11/2010 | Saika ..................... 713/324 |
| 2011/0016336 A1 * | 1/2011 | Mori et al. ................ 713/320 |
| 2012/0036041 A1 | 2/2012 | Hesselink |
| 2012/0096053 A1 * | 4/2012 | Lehr et al. ................. 707/809 |
| 2012/0314358 A1 * | 12/2012 | Ting ...................... 361/679.09 |
| 2013/0027220 A1 | 1/2013 | Marwah et al. |
| 2013/0124817 A1 * | 5/2013 | Goto et al. ................ 711/170 |
| 2013/0212401 A1 | 8/2013 | Lin |
| 2013/0266137 A1 | 10/2013 | Blankenbeckler et al. |
| 2013/0268749 A1 | 10/2013 | Blankenbeckler et al. |
| 2013/0268759 A1 | 10/2013 | Blankenbeckler et al. |
| 2013/0268771 A1 | 10/2013 | Blankenbeckler et al. |
| 2014/0095439 A1 | 4/2014 | Ram |
| 2014/0169921 A1 | 6/2014 | Carey |
| 2014/0173215 A1 | 6/2014 | Lin et al. |
| 2014/0258677 A1 * | 9/2014 | Sasanka et al. ............. 712/7 |
| 2014/0297977 A1 * | 10/2014 | Sueda ..................... 711/160 |

* cited by examiner

DETECTION OF USER BEHAVIOR USING TIME SERIES MODELING

CROSS-REFERENCE TO RELATED APPLICATION

This application claims priority to U.S. Provisional Application No. 61/807,665, filed Apr. 2, 2013, which is herein incorporated by reference in its entirety.

BACKGROUND

The responsiveness of a computing device is an important characteristic of its performance. Ideally, a computing device is able to respond to a user as quickly as possible.

For example, storage devices attempt to provide access to their stored data as efficiently and as quickly as possible. Today, solid-state drives (SSDs) have become popular due to their near-zero data access-time delay (DATD) performance relative to hard disk drives (HDDs). HDDs, however, still offer higher capacity storage at a lower cost relative to SSDs. Accordingly, HDDs remain popular due to their high capacity and durability. Indeed, many known products, such as solid state hybrid drives (SSHD) now provide a combination of SSD and HDD as a storage solution.

HDDs normally have a high DATD because they are frequently put into a standby mode in order to conserve power, etc. For example, mobile devices, such as a laptop, wireless Network Attached Storage (NAS), or any other mobile device, frequently employ aggressive HDD standby policies. HDDs may also be put into a standby mode for data safety reasons during various movements the head would not make contact with the disk.

Unfortunately, when exiting standby mode in response to a data access request, an HDD may take a long time for the drive to spin back up. Moreover, as the hard drive capacities increase, the DATD may also increase when coming out of standby mode.

Therefore, it would be desirable to provide methods and systems that can minimize the DATD of a HDD. It would also be desirable to provide methods and systems that can improve the responsiveness of any computing device, especially after idle periods of time.

BRIEF DESCRIPTION OF THE DRAWINGS

Systems and methods which embody the various features of the invention will now be described with reference to the following drawings, in which.

DETAILED DESCRIPTION

Overview—Predicting User Behavior and Data Access Requests

Embodiments of the present invention improve the data access time delay for accessing stored data based on predicting when data access requests may occur. In some embodiments, the storage device observes user behavior and uses time series modeling to predict or anticipate when a user is likely to access a storage system. Some embodiments are implemented on storage devices containing one or more hard disk drives alone or in combination with other types of storage devices. The embodiments may employ software, firmware, etc. to implement the predictive algorithms used to anticipate when data access requests may occur.

For the purpose of illustration, an example will now be described with reference to a network-attached storage that comprises one or more hard disk drives. Those skilled in the art will recognize that the embodiments may be implemented on a wide variety of types of storage types, such as direct-attached storage, storage area networks, and the like.

Certain embodiments will now be described. These embodiments are presented by way of example only, and are not intended to limit the scope of the inventions. Indeed, the novel methods and systems described herein may be embodied in a variety of other forms. Furthermore, various omissions, substitutions and changes in the form of the methods and systems described herein may be made without departing from the spirit of the inventions. To illustrate some of the embodiments, reference will now be made to the figures.

Figure 1:
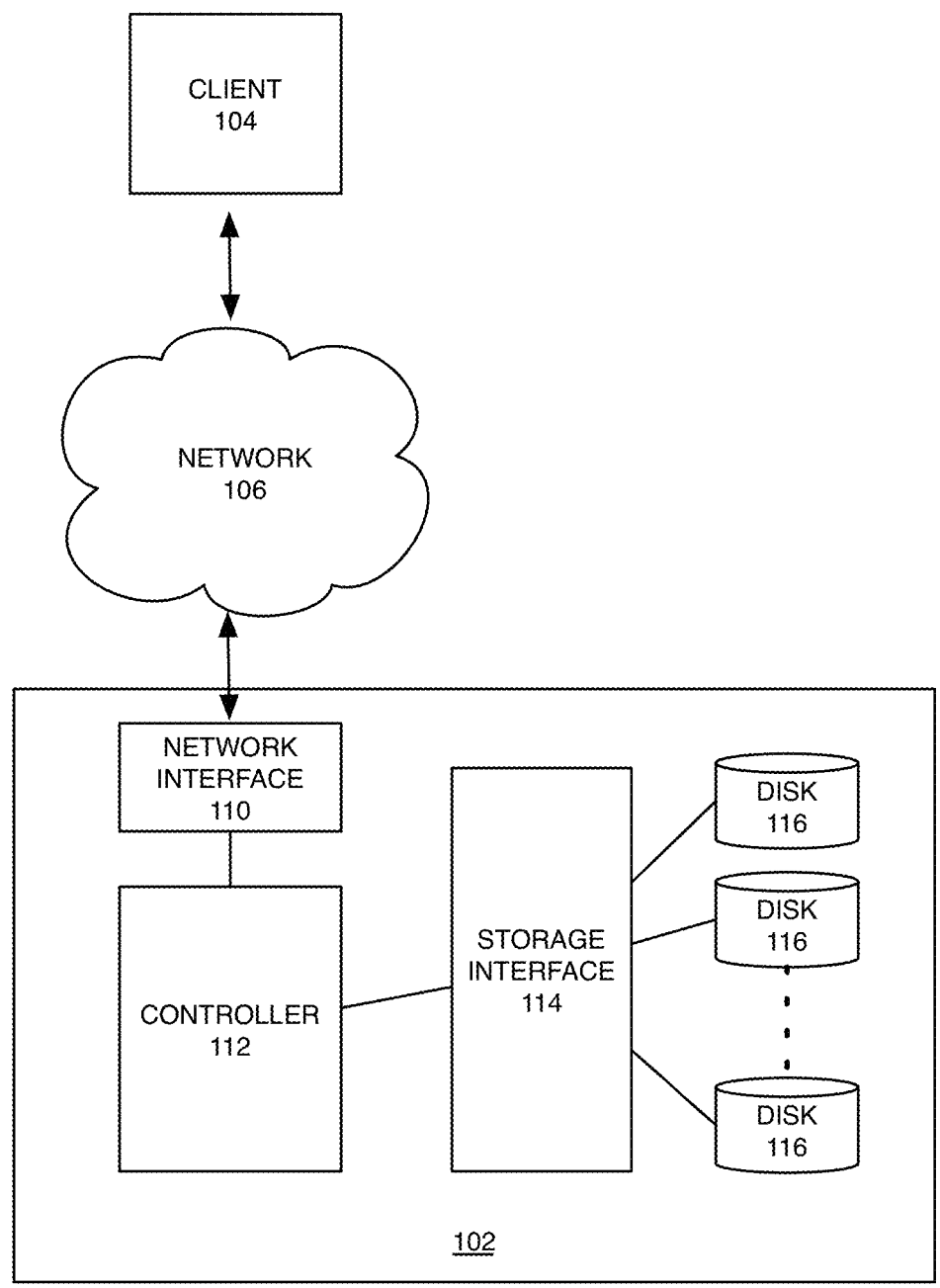
FIG. 1 illustrates an exemplary system in which embodiments of the present invention may be implemented.
Figure 1A:
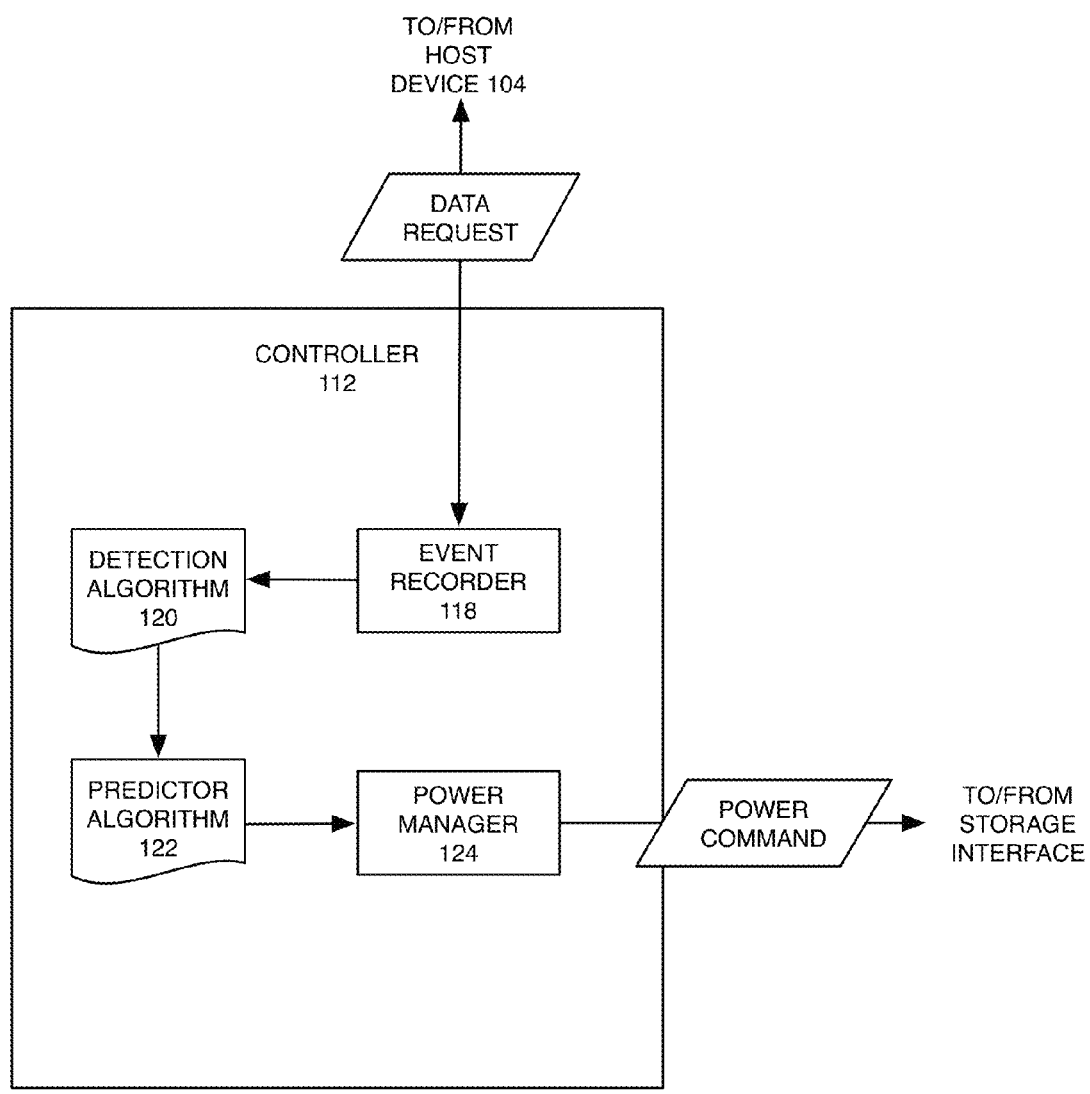
FIG. 1A illustrates an exemplary controller that is configured to predict user data requests in accordance with embodiments of the present invention.
Figure 2:
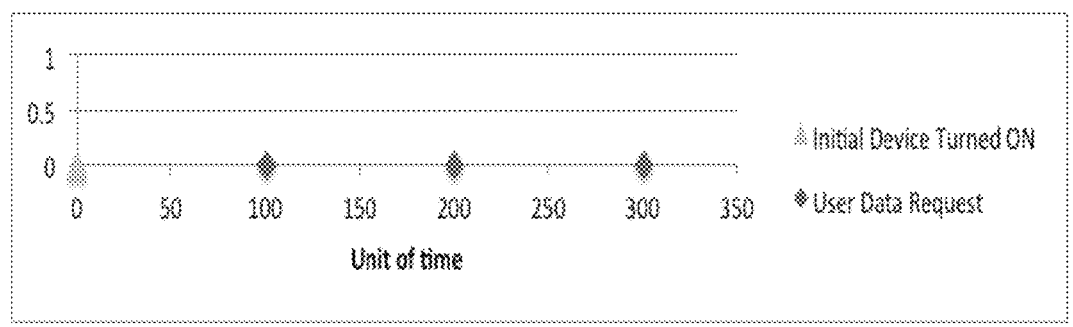
FIG. 2 illustrates an exemplary user behavioral pattern.
Figure 3:
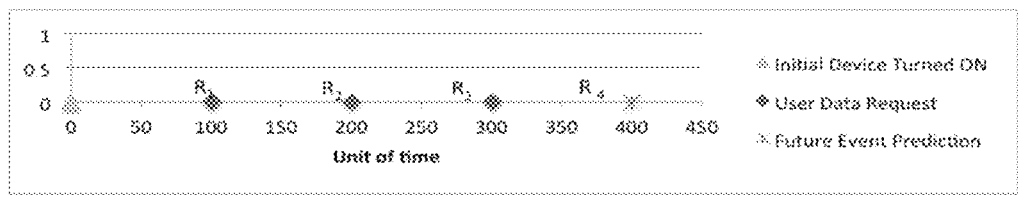
FIG. 3 illustrates an exemplary predicted access event based on time series modeling by some embodiments of the present invention.
Figure 4:
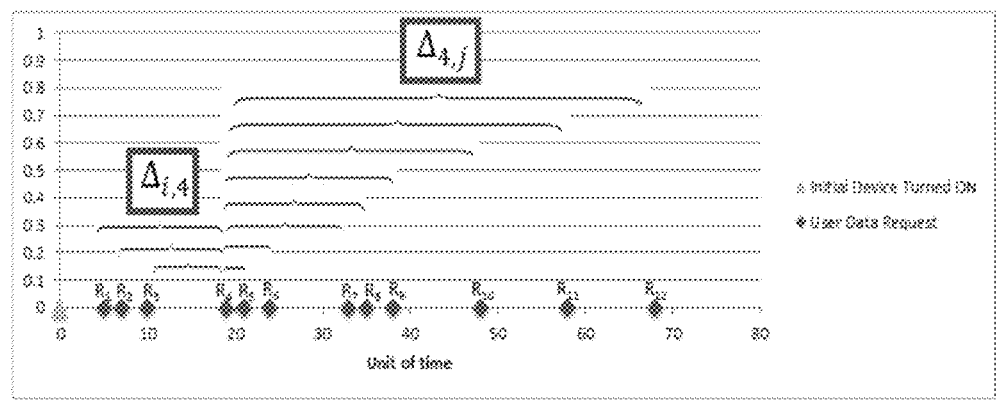
FIG. 4 illustrates exemplary time series modeling used by some embodiments to predict various data access events.
Figure 5:
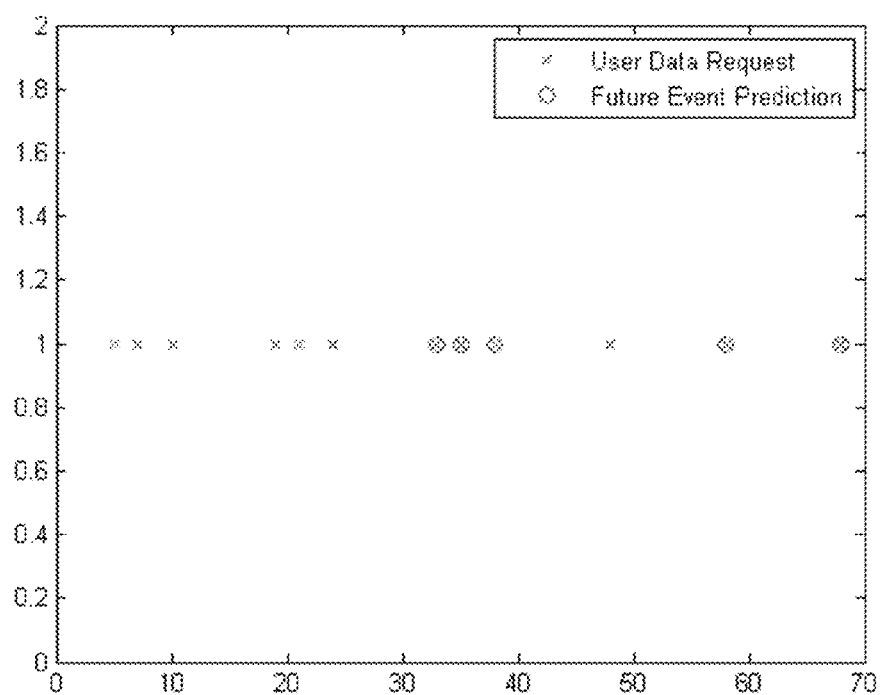
FIG. 5 illustrates an exemplary graph of data access events predicted by the some embodiments and actual user data requests.
Figure 6:
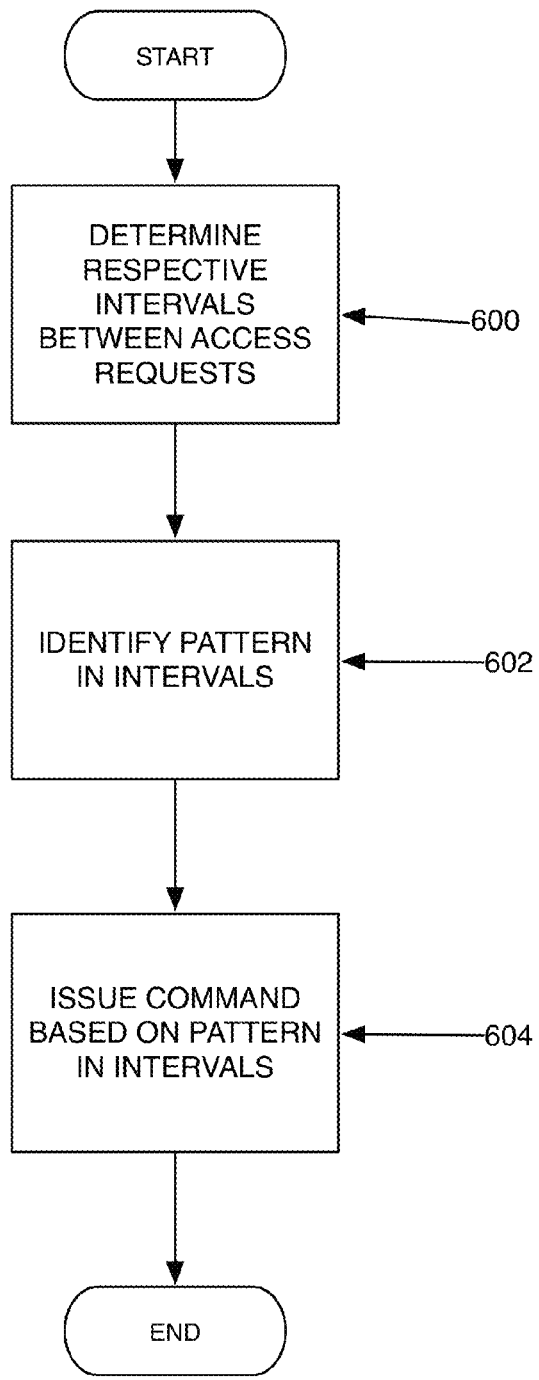
FIG. 6 illustrates an exemplary process flow.

FIG. 1 illustrates an exemplary system. FIG. 1A illustrates an exemplary controller that is configured to predict user data requests in accordance with embodiments of the present invention. FIG. 2 illustrates an exemplary user behavioral pattern, which may be analyzed and predicted by the embodiments. FIG. 3 illustrates an exemplary predicted access event based on time series modeling by some embodiments of the present invention. FIG. 4 illustrates exemplary time series modeling used by some embodiments to predict various data access events. FIG. 5 illustrates an exemplary graph of data access events predicted by some embodiments and actual user data requests. FIG. 6 illustrates an exemplary process flow. FIGS. 1-5 will now be further described below.

Exemplary System—FIG. 1

FIG. 1 shows an exemplary system of an embodiment of the present invention. The embodiments of the present invention may be implemented on any type of storage device or device that provides file notification services. For purposes of illustration, an exemplary system 100 is shown with a network-attached storage (NAS) 102 that services a client (or host device) 104 via a network 106. The system 100 may also be used in other devices in which predictive capabilities are desired, such as mobile devices, media streaming/playback devices, laptops, tablets, desktop computers, smart televisions, or other types of electronic devices. An exemplary embodiment with these components will now be briefly described below.

Exemplary Storage Device—NAS 102

The NAS 102 is file-level storage device that is capable of connecting to a network, such as network 106 and provides access to files stored in its storage medium as a file server. In one embodiment, NAS 102 is implemented with known hardware, software, and firmware. For example, in one embodiment, the NAS 102 is configured as an appliance having an embedded operating system. The NAS 102 may support a variety of operating systems, such as UNIX, LINUX, Windows, and the like. As will be further described, the NAS 102 may also comprise multiple storage mediums, such as one or more hard disks that are arranged into a redundant array of independent disks (RAID). Furthermore, the NAS 102 may support various protocols, such as NFS, SMB/CIFS, AFP, etc.

As shown, the NAS 102 may comprise a network interface 110, a controller 112, a storage interface 114, and a storage array of disks 116. These components will now be briefly described below.

Network interface 110 serves as the network communications interface for the NAS 102 to/from network 106. For example, in one embodiment, the network interface 200 may comprise one or more Gigabit Ethernet, Ethernet, Universal Serial Bus (USB), or other interfaces for communications with network 106. Such components are known to those skilled in the art.

Controller 112

Controller 112 represents the hardware and software that manages the disks 116 of the NAS 102 and presents them as a logical unit or volume to the clients 104. In some embodiments, the controller 112 may also comprise one or more other components to supplement its operations, such as an on-chip RAID controller, a memory or disk cache, etc. Furthermore, in the embodiments, the controller 112 is configured to observe user behavior with regard to data requests from client 104, detect patterns in that behavior, and predict various future data requests. The controller 112 may then manage or manipulate the operations and power state of the various disks 116 via the storage interface 114. In some embodiments, the controller 112 employs a time series modeling to predict future data requests and manages the disks 116 accordingly to improve their data access time and/or minimize their DATD. An example of the time series modeling algorithms and implementations is described further below.

Storage Interface 114

Storage interface 114 serves as an interface between the controller 112 and the disks 206. The storage interface 114 may support various communications, such as SAS, SATA, SCSI, etc.

Disk 116

Disks 116 represent the storage medium and associated electronics for the devices storing data for the NAS 102. In one embodiment, the disks 116 may be implemented as hard disk drives, such as those provided by Western Digital Technologies, Inc. Of course, in other embodiments, the NAS 102 may comprise other types of storage media and devices, such as solid-state drives, hybrid drives, etc. Any type of storage drive that can be configured as part of a RAID may be implemented as part of an embodiment of the present invention.

Alternatively, as noted above, in other embodiments, the system 100 may comprise direct attached storage devices or external drives. For example, the system 100 may comprise one or more external drives, such as the MyBook or Passport devices provided by Western Digital Technologies, Inc.

Clients 104

Clients 104 represent the various client devices that may store and/or access files on the NAS 102. For example, the clients 104 may be a desktop, a laptop, a tablet, a smart phone, etc. The embodiments support any device that can access a file stored on the NAS 102.

Network 106

Network 106 provides a communication infrastructure for data communications between the components of system 100. Network 106 may comprise known network elements, such as hubs, switches, routers, firewalls, etc., to facilitate and secure these communications. In the embodiments, the network 106 may comprise a local area network, a wide area network, etc. In addition, the network 106 may comprise wired and wireless links or components to carry its communications.

Exemplary Controller Implementing Time Series Modeling—FIG. 1A

Further to FIG. 1, FIG. 1A shows a more detailed block diagram of the controller 112 that is configured to predict future data requests based on time series modeling. In some embodiments, the controller 112 may implement a time series modeler that comprises four main components: (1) an event recorder 118; (2) a detection algorithm 120; (3) a predictor algorithm 122; and (4) a power manager 124. These components will now be further described.

Event Recorder 118

The event recorder 118 records information about the data requests received from the client 104. The event recorder 118 may record various aspects of the data requests, such as date/time of the request, file type, file size, etc. The event recorder 118 may be implemented in the controller 112 in a wide variety of ways. For example, the event recorder 118 may be firmware within the controller 112 that is configured to perform the functions of recording data requests. As another example, the event recorder 118 may be software running in the controller 112 that continually records the behavior of the user of the device over time. In some embodiments, the event recorder 118 records some or all of the data requests from the clients 104 and every data point (or a selection of data points) essentially serves as a training point and the collection of data points continually adds to the accuracy of the overall prediction.

Detection Algorithm 120

The controller 112 executes the detection algorithm 120 to recognize various patterns within the previously data collected by the event recorder 118. In some embodiments, the detection algorithm 120 determines the various inter-arrival intervals of the data requests to generate a set of time series of intervals. The detection algorithm 120 may then identify or detect user behavior based on the patterns existing in these time series of intervals.

Predictor Algorithm 122

The controller 112 may also execute a predictor algorithm 122. Once a pattern has emerged, the predictor algorithm 122 provides the logic for predicting the future behavior of the user and when one or more future data requests from client 104 is expected. The predictor algorithm 122 may output its predictions in various formats, such as a time offset, a confidence factor, etc.

Power Manager 124

Finally, the controller 112 may comprise a power manager 124. The power manager 124 manages the power state and power consumption of the NAS 102, such as the storage interface 114 and disks 116. In some embodiments, the controller 112 is configured to use the power manager 124 to anticipate user data request usage based on the predictions of the predictor algorithm 122. For example, in response to a predicted future data request by the predictor algorithm 122, the controller 112 may signal the power manager 124 to transition the power state of the disks 116 to commence spinning the hard disks 116 at the predicted time of the next data request. In addition, the controller 112 may signal the power manager 124 to power down or reduce the power consumption of the disks 116 and/or the storage interface 114 when a long idle period or time until the next data request is predicted. Various thresholds for when the controller 112 and the power manager 124 change the power state and operation may vary, for example, based on spin up times, communications latency, read/write latency, etc. Furthermore, the controller 112 and the power manager 124 may modify its power management schemes based on various criteria, such as battery charge state, frequency of data requests, and the like.

Example of Time Series Modeling

To illustrate the concepts of the invention, the detection and prediction algorithms will now be described further below with reference to FIGS. 2-5. For the purpose of illustration, a simple example of a user behavior and series of data requests is shown with reference to FIG. 2.

FIG. 2—Example User Behavior (Simplified)

As shown in FIG. 2, the graph can represent the behavior of a user at client 104 that has accessed data on the device in 100 hour intervals since he has turned on the NAS 102 initially. In this example, the controller 112 can thus make a simple prediction can from such user behavior.

FIG. 3—Prediction of User Behavior

For example, FIG. 3 illustrates a predicted data request event determined by the controller 112. As shown, various "User-Data-Request" points (to indicate data requests from the client 104) are marked as $R_n$ and a "Future Event Prediction" point predicted by the controller 112 is marked as $P_n$ where n is 1, 2, 3, and so forth. As can be seen, the time interval between $R_2$ and $R_1$ may be represented as $\Delta_1$ and $R_3$ and $R_2$ may be represented as $\Delta_2$.

In one embodiment, if $\Delta_1$ and $\Delta_2$ are found to be equal or within a certain tolerance, the predictor algorithm 122 can predict a pattern and hence a future data request. That is, the next user request can be predicted $\Delta_1$ or $\Delta_2$ away from $R_3$ (i.e. about 100 hours).

Accounting for Fluctuations and/or Variations

In some embodiments, in order to account for some fluctuations in user request behavior, the prediction algorithm 122 may include an error buffer. For example, the algorithm may formulated and simplified below:

$$\text{if } |\Delta_{n+1} - \Delta_n| \leq \epsilon_r \Rightarrow \Delta'_{n+2} = \min(\Delta_n, \Delta_{n+1}) - \epsilon_r - t_s,$$

where min is the minimum function, $\epsilon_r$ is the buffer accounting for fluctuations in user request, and $t_s$ is the DATD, such as the time it takes for the drive to spin up and device to get ready to response to user's request), and finally $\Delta'_{n+2}$ is the future prediction interval (shown in FIG. 3 as the interval between $R_3$ and $P_1$).

In one embodiment, for the ease of computation, the detection algorithm 120 is configured to express the deltas in matrix form as suggested below:

$$\begin{bmatrix} \Delta_{1,1} & \cdots & \Delta_{1,j} \\ \vdots & \ddots & \vdots \\ \Delta_{i,1} & \cdots & \Delta_{i,j} \end{bmatrix}$$

where $\Delta_{i,j}$ refers to the time interval between $R_i$ and $R_j$.

As can be seen, the matrix is a square matrix with all the elements on its main diagonal equaling 0. In addition, the lower triangular part of the matrix contains the same data as the upper triangular part of the matrix so that lower triangular part can be neglected (for example to conserve memory) and based on these the simplification of the above matrix the following matrix results:

$$\begin{bmatrix} 0 & \Delta_{1,2} & \cdots & \Delta_{1,j} \\ 0 & 0 & \cdots & \Delta_{2,j} \\ \vdots & \vdots & \ddots & \vdots \\ 0 & 0 & \cdots & 0 \end{bmatrix}$$

Accordingly, any row i contains all deltas pertaining to a data request point $R_j$ to all other future data request points. Also any column j contains all deltas pertaining to intervals from all other past data request point to $R_j$. In order to visualize this example, FIG. 4 shows the graph illustrating the intervals expressed in the matrix.

Time Series Modeling—Additional Example

In some embodiments, the controller 112 is configured to perform time series modeling to identify patterns within the matrix, based on the prediction algorithm 122. An example of the detection algorithm 120 and time series modeling will now be provided in reference to the following hypothetical user pattern.

| | User Data Request points | | | | | | | | | | | |
|---|---|---|---|---|---|---|---|---|---|---|---|---|
| | $R_1$ | $R_2$ | $R_3$ | $R_4$ | $R_5$ | $R_6$ | $R_7$ | $R_8$ | $R_9$ | $R_{10}$ | $R_{11}$ | $R_{12}$ |
| Unit of Time (hrs) | 5 | 7 | 10 | 19 | 21 | 24 | 33 | 35 | 38 | 48 | 58 | 68 |

From this dataset, the controller 112 may construct the following simplified matrix below:

| 0 | 2 | 5 | 14 | 16 | 19 | 28 | 30 | 33 | 43 | 53 | 63 |
|---|---|---|----|----|----|----|----|----|----|----|----|
| 0 | 0 | 3 | 12 | 14 | 17 | 26 | 28 | 31 | 41 | 51 | 61 |
| 0 | 0 | 0 | 9  | 11 | 14 | 23 | 25 | 28 | 38 | 48 | 58 |
| 0 | 0 | 0 | 0  | 2  | 5  | 14 | 16 | 19 | 28 | 39 | 49 |
| 0 | 0 | 0 | 0  | 0  | 3  | 12 | 14 | 17 | 27 | 37 | 47 |
| 0 | 0 | 0 | 0  | 0  | 0  | 9  | 11 | 14 | 24 | 34 | 44 |
| 0 | 0 | 0 | 0  | 0  | 0  | 0  | 2  | 5  | 15 | 25 | 35 |
| 0 | 0 | 0 | 0  | 0  | 0  | 0  | 0  | 3  | 13 | 23 | 33 |
| 0 | 0 | 0 | 0  | 0  | 0  | 0  | 0  | 0  | 10 | 20 | 30 |
| 0 | 0 | 0 | 0  | 0  | 0  | 0  | 0  | 0  | 0  | 10 | 20 |
| 0 | 0 | 0 | 0  | 0  | 0  | 0  | 0  | 0  | 0  | 10 | 10 |

In one embodiment, the detection algorithm 120 may be implemented based on the following pseudo-code to identify patterns in the user access request.

```
clc
G=[];
I=[5 7 10 19 21 24 33 35 38 48 58 68]; % vector of intervals starting at t=1
I_size=size(I');
for i=1:I_size;
for j=1:I_size
Delta(i,j)=abs(I(i)-I(j));
end
end
Delta=triu(Delta)
for i=1:I_size
col_v=Delta(:,i);
row_v=Delta(i,:);
t_col=col_v(col_v~=0);
t_row=row_v(row_v~=0);
RESULT=ismember(col_v,t_row);
[row_i,col_i]=find(RESULT==1);
```

```
if isempty(Delta(row_i,i))
% disp 'this is empty'
% Delta(row_i,i))
else
detected_delta=Delta(row_i,i)
G(end+1)=I(i)+detected_delta;
end
end
figure
plot(I,1,'bx',G,1,'ro');
legend('User Data Request','Future Event Prediction');
```

The above code also performs the prediction of the user behavior and produces the following graph as shown in FIG. 5. As can be seen, the user has interacted with the NAS 102 with data requests that arrive in a distinct pattern. The exemplary matrix below shows a pattern that has been identified by the detection algorithm 120 matching series of intervals that are common to both a row and a column from a selected element of the matrix.

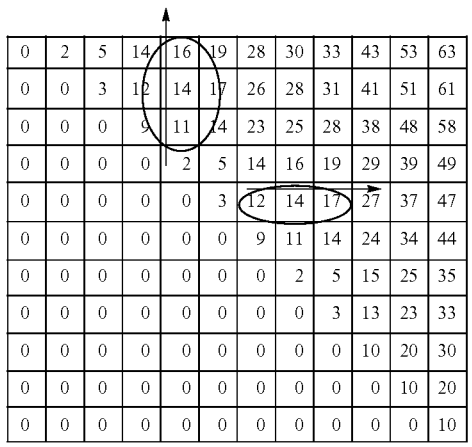

In some embodiments, some or all of above system and its components are executed or embodied by one or more physical or virtual computing systems. For example, in some embodiments, a computing system (such as a server, mobile device or other computing device) that has components including a central processing unit (CPU), input/output (I/O) components, storage and/or memory may be used to execute some or all of the components of the above system. The I/O components can include a display, a network connection to the network, a computer-readable media drive and/or other I/O devices (e.g., a keyboard, a mouse, a touch screen, speakers, etc.).

FIG. 6 illustrates an exemplary process flow for predicting future access of a storage device, such as storage device 102. In stage 600, the event recorder 118 in storage device 102 records data requests are received for files stored on the disks 116. The controller 112 then determines respective intervals between each access request to any subsequent access request of the storage device 102. For example, the controller 112 may generate a data structure, such as an array or matrix, wherein each element indicates the interval (or delta). In some embodiments, the matrix may be further simplified or reduced because the matrix is a square matrix, and thus, the lower triangular half can be neglected. As noted, the matrix may be stored in a memory (not shown) by controller 112. An example of such a matrix is shown above.

In stage 602, the controller 112 identifies a pattern in the respective intervals. For example, as noted above, the controller 112 may execute program code or coordinate with a hardware or firmware component that implements a prediction algorithm, such as predictor algorithm 122 described above.

In stage 604, the controller 112 predicts a next access request based on the pattern in the respective intervals. In particular, the controller 112 determines a time for the next data request, based on the output of the predictor algorithm. The predicted next data request may be provided as an absolute time, a time offset, a range, etc. The predicted next data request may also have associated meta-data, such as a confidence factor, the type of data request, etc.

In stage 604, the controller 112 may issue one or more commands based on the next anticipated data request. For example, the controller 112 may activate or deactivate the proactively activating the storage device based on the predicted next access request. For example, the controller 112 may transition the disks 116 from one power state to another power state, such as active to standby. The controller 112 may also activate or deactivate other components, such as the network interface 110, the storage interface 114, etc., for example, to conserve battery consumption or maximize performance. Furthermore, the controller 112 may command the caching or pre-fetching of various files stored on the disks 116 based on the next predicted data request.

In one embodiment, the controller 112 may be configured to employ the time series modeling to optimize battery life of the storage device 102. For example, the controller 112 may comprise a power manager 124 that controls the power management of the storage device 102, especially the power consumption of the disks 116. In some embodiments, the power manager 124 may transition the power state of disks 116 to commence spinning down or up of the disks 116 when a long idle time is requested or when a next data request is predicted.

Furthermore, the controller 112 may also account for various tolerances, such as spin up delay of the disks 116, etc. The tolerances may be based on known characteristics of the disks 116 or based on meta-data provided by the detection algorithm 120.

Each of the processes, methods and algorithms described in the preceding sections may be embodied in, and fully or partially automated by, code modules executed by one or more computers, computer processors, or machines configured to execute computer instructions. The code modules may be stored on any type of non-transitory computer-readable storage medium or tangible computer storage device, such as hard drives, solid state memory, optical disc and/or the like. The processes and algorithms may be implemented partially or wholly in application-specific circuitry. The results of the disclosed processes and process steps may be stored, persistently or otherwise, in any type of non-transitory computer storage such as, e.g., volatile or non-volatile storage.

The features and attributes of the specific embodiments disclosed above may be combined in different ways to form additional embodiments, all of which fall within the scope of the present disclosure. Although the present disclosure provides certain embodiments and applications, other embodiments that are apparent to those of ordinary skill in the art, including embodiments, which do not provide all of the features and advantages set forth herein, are also within the scope of this disclosure. Accordingly, the scope of the present disclosure is intended to be defined only by reference to the appended claims.

What is claimed is:

1. A method of predicting future access of a storage device, said method comprising:
   determining respective time intervals between each access request to any subsequent access request of the storage device;
   arranging the respective time intervals in a matrix;
   identifying a pattern in the respective time intervals, including determining first set of intervals occurring in a column of the matrix that correspond to a second set of intervals occurring in a row of the matrix;
   predicting a next access request based on the pattern in the respective time intervals; and
   proactively activating the storage device based on the predicted next access request.

2. The method of claim 1, wherein proactively activating the storage device comprises proactively spinning up a hard disk drive before the predicted next access request based on a spin up time of the hard disk.

3. The method of claim 1, wherein proactively activating the storage device comprises proactively activating the storage device before the predicted next access request based on the respective intervals and a tolerance.

4. The method of claim 1, further comprising determining an error tolerance between the respective intervals.

5. The method of claim 4, further comprising grouping a plurality of access requests that occur within the error tolerance.

6. The method of claim 1, wherein each column of the matrix indicates time intervals from all other past user access requests and wherein each row of the matrix indicates time intervals to subsequent user access requests.

7. A method of managing an electronic device based on predicting user behavior, said method comprising:
   recording a series of user access requests of the electronic device over a period of time;
   determining respective time intervals between the series of user access requests;
   arranging the respective time intervals into a matrix wherein each column of the matrix indicates time intervals from all other past user access requests and wherein each row indicates time intervals to subsequent user access requests;
   identifying a pattern of user access requests based on modeling the series of user access requests based on matching a series of time intervals of the user access requests by identifying a sequence of intervals that occur in both a row and column from a selected element in the matrix;
   determining a predicted time of a next user access request based on the identified pattern; and
   initiating an action on the electronic device based on the predicted time of the next user access request.

8. The method of claim 7, wherein identifying the pattern of user access requests comprises identifying a sequence of intervals that occur in both a row and column from a selected element in the matrix within a tolerance.

9. The method of claim 7, wherein initiating the action on the electronic device comprises initiating spin up of a hard disk drive.

10. The method of claim 7, wherein initiating the action on the electronic device comprises initiating a spin down of a hard disk drive.

11. The method of claim 7, wherein initiating the action on the electronic device comprises transitioning a storage drive from a standby state to an active state.

12. The method of claim 7, wherein initiating the action on the electronic device comprises transitioning a storage drive from an active state to a standby state.

13. A storage device configured to anticipate user behavior based on modeling a time series of user access requests, said storage device comprising:
   at least one storage medium;
   a controller comprising:
      an event recorder configured to record a time series of user access requests for data from the at least one storage medium and to store the time series in a matrix, wherein each column of the matrix indicates time intervals from all other past user access requests and wherein each row indicates time intervals to subsequent user access requests;
      a power manager configured to manage power consumption of the at least one storage medium based on an active state and a standby state;
      a time series modeler configured to detect patterns of user behavior based on intervals in the time series between user access requests, wherein the time series modeler is configured to detect patterns of user behavior based on matching sequences of intervals occurring both a row and a column of the matrix; and
      a predictor configured to predict a next user access request based on the patterns of user behavior and send a signal to the power manager to transition the storage device from a first power state to a second power state in anticipation of the predicted next user access request.

14. The storage device of claim 13, wherein predictor is configured to send a signal to transition the at least on storage medium from a standby state to an active state in anticipation of the predicted next user access request.

15. The storage device of claim 13, wherein predictor is configured to send a signal to transition the at least on storage medium from an active state to a standby state in anticipation of the predicted next user access request.

16. A device configured to predict user behavior, said device comprising:
   a storage storing information subject to user access requests; and
   a processor configured by executable program code to record a series of user access requests of the device over a period of time, determine respective intervals between the series of user access requests, identify a pattern of user access requests based on modeling the series of user access requests based on matching a series of time intervals of the user access requests, determine a predicted time of a next user access request based on the identified pattern, and initiate an action on the device based on the predicted time of the next user access request,
   wherein the processor is configured to arrange the respective intervals into a matrix stored in a memory coupled to the processor, wherein each column of the matrix indicates intervals from all other past user access requests and wherein each row indicates intervals to subsequent user access requests; and
   wherein the processor is configured to identify access requests based on identifying a sequence of intervals that occur in both a row and column from a selected element in the matrix.

17. The device of claim 16, wherein the storage comprises a hard disk drive and the processor is configured to initiate spin up of a hard disk drive.

18. The device of claim 16, wherein the storage comprises a hard disk drive and the processor is configured to initiate spin down of a hard disk drive.

19. The device of claim 16, wherein the storage comprises a hard disk drive and the processor is configured to transition the hard disk drive from a standby state to an active state.

20. The device of claim 16, wherein the storage comprises a hard disk drive and the processor is configured to transition the hard disk drive from an active state to a standby state.

21. The device of claim 16, wherein the processor is configured to initiate caching content responsive to the pattern of user access.

22. The device of claim 16, wherein the processor is configured to connect to a network responsive to the pattern of user access.

* * * * *